Sept. 9, 1924.

P. JARAY 1,508,227

AIRCRAFT SHED

Filed Oct. 4, 1921

INVENTOR:
Paul Jaray
by McKilwain
Attorney.

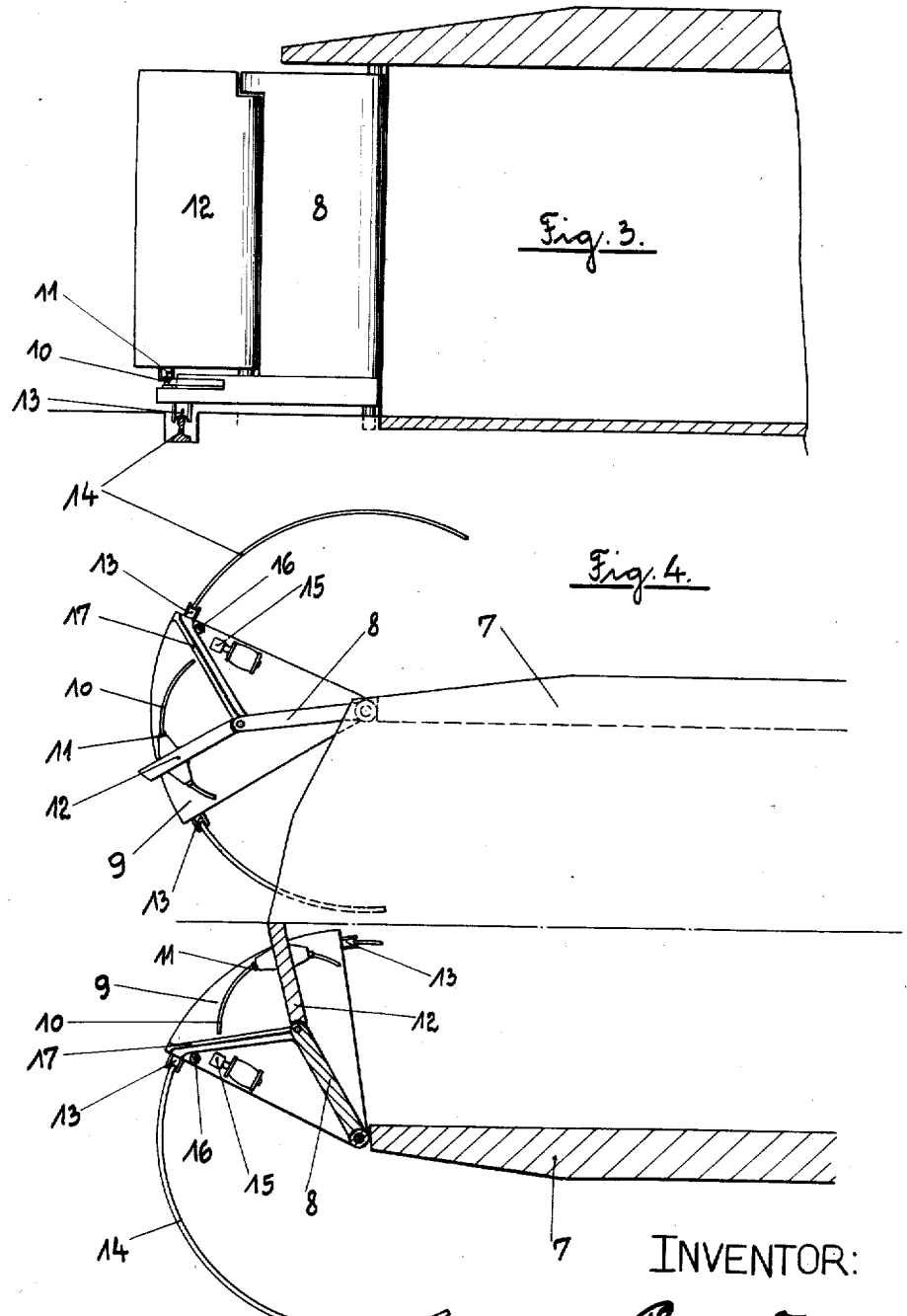

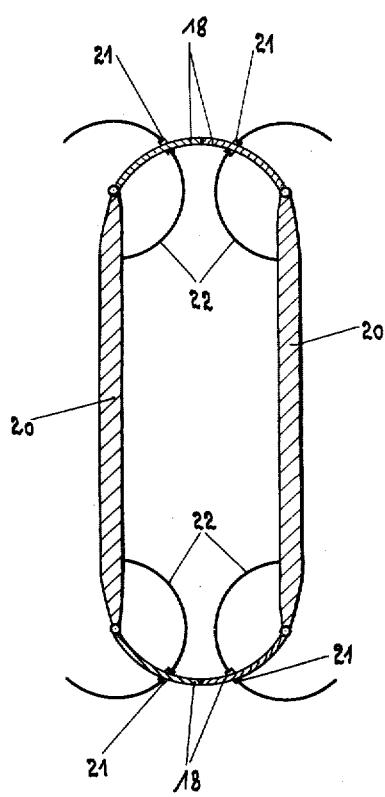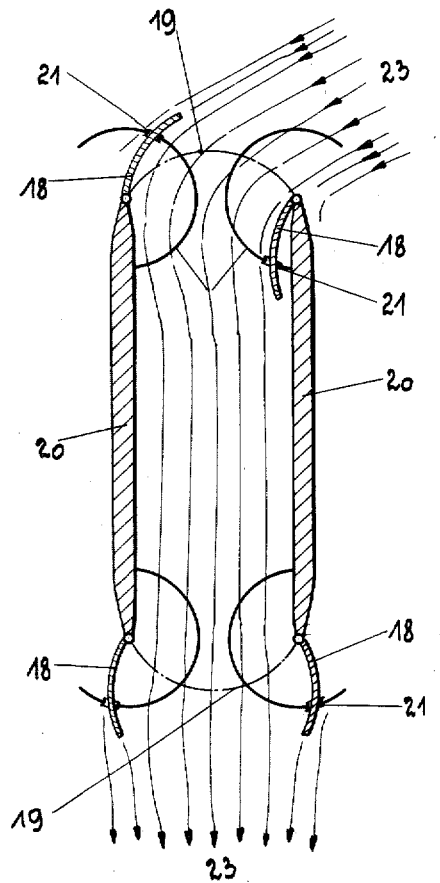

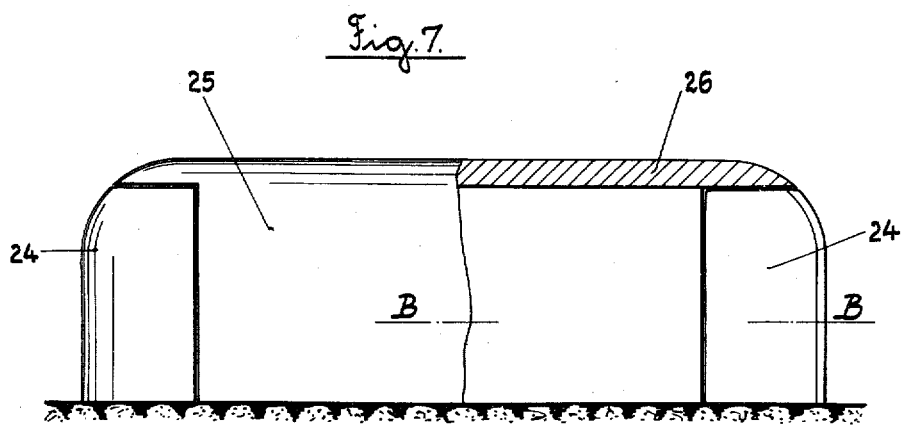
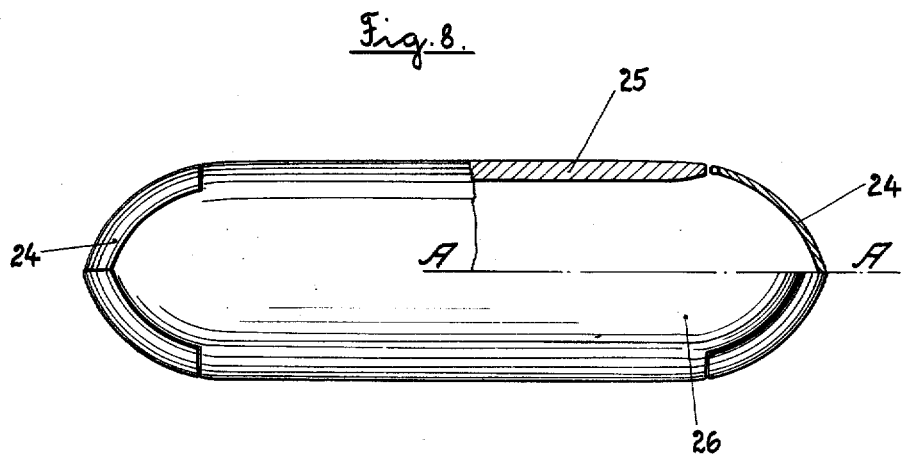

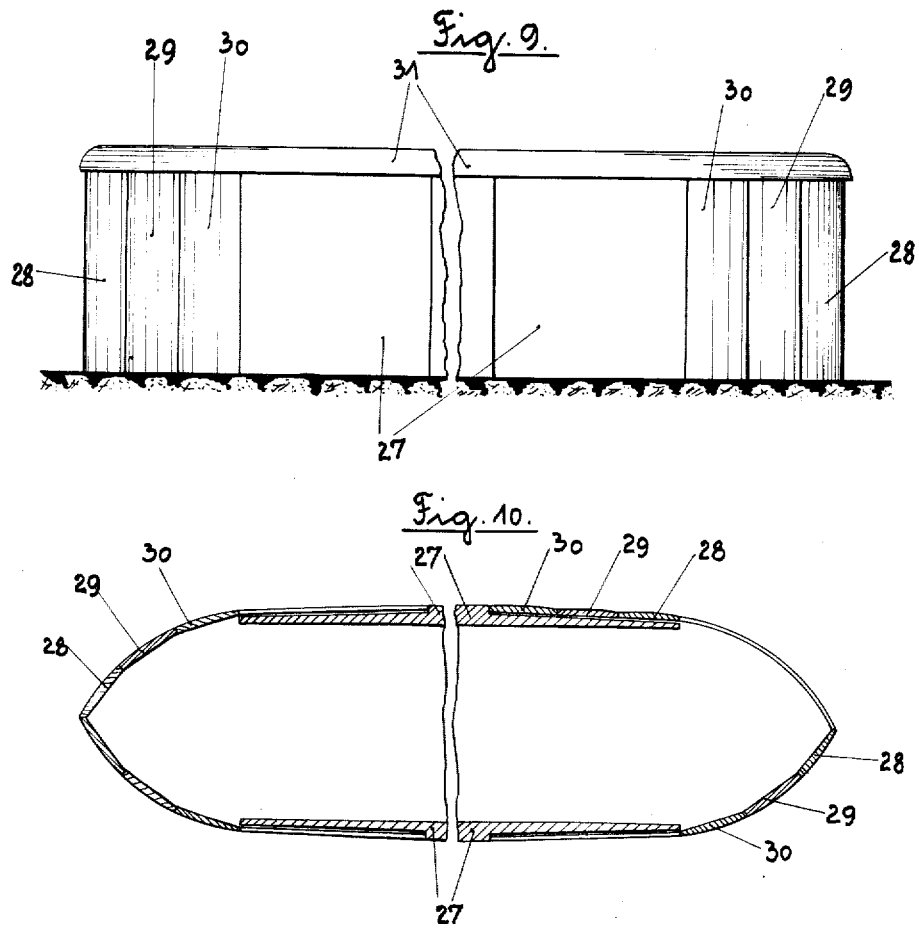

Sept. 9, 1924.
P. JARAY
AIRCRAFT SHED
Filed Oct. 4, 1921
1,508,227
6 Sheets-Sheet 6
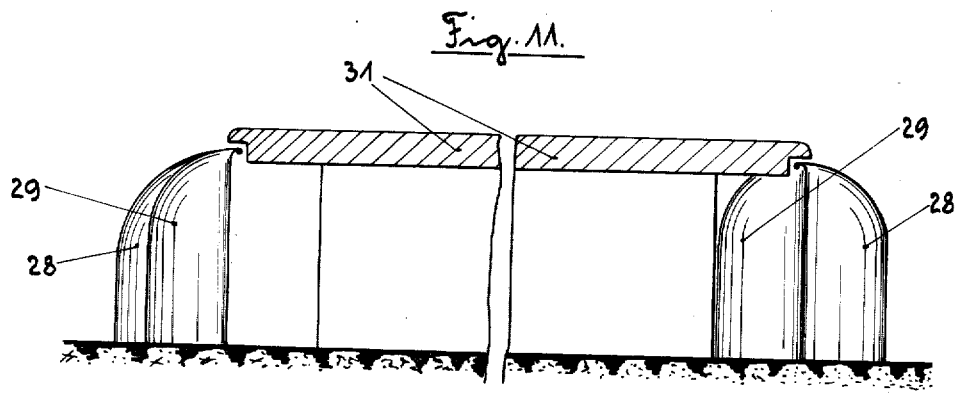
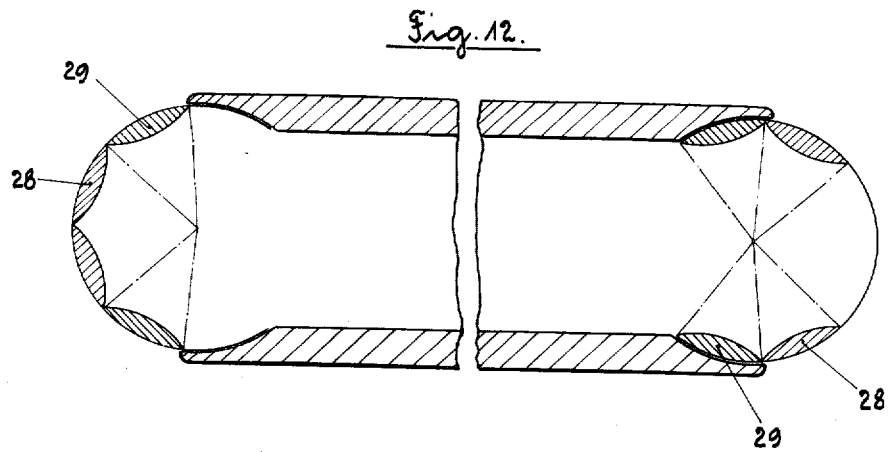
INVENTOR:
Paul Jaray
by D. Kennedy
Attorney.

Patented Sept. 9, 1924.

1,508,227

UNITED STATES PATENT OFFICE.

PAUL JARAY, OF FRIEDRICHSHAFEN, GERMANY, ASSIGNOR TO THE FIRM:—LUFT-SCHIFFBAU ZEPPELIN GESELLSCHAFT MIT BESCHRANKTER HAFTUNG, OF FRIEDRICHSHAFEN, GERMANY.

AIRCRAFT SHED.

Application filed October 4, 1921. Serial No. 505,321.

*To all whom it may concern:*

Be it known that I, PAUL JARAY, an Austrian citizen, residing at Friedrichshafen a/B., Germany, have invented certain new and useful Improvements in Aircraft Sheds, of which the following is a specification.

My invention relates to sheds for aircraft and more particularly airships. It is an object of my invention to facilitate the recovery of air craft and particularly airships in a side wind.

Various expedients have already been proposed for this purpose, however in view of the dimensions required all devices heretofore known, are very expensive. This applies to wind screens as well as to recovering devices such as winches, cars and the like. Moreover, all such devices are inffective and unreliable.

According to the present invention, the problem is solved in an extraordinarily simple and therefore comparatively inexpensive manner by producing as an effective protection from side wind a strong current of air flowing in a direction approximately parallel to the longitudinal axis of the shed, such current allowing the airship to be safely and readily recovered. This is effected by making the inner surface of the longitudinal walls of the shed as smooth as possible, pillars and girders, if any, being arranged without and the doors being adapted to be so adjusted as to form a sort of wind funnel which intercepts the wind and directs it into the shed. This current leaves the shed at the opposite end as a uniform jet which is but gradually deflected by the side wind. Pillars and girders outside the shed may have a favourable influence by reducing the wind velocity at the outside and somewhat break up the large eddies on the lee-side. In this manner, it is possible to recover the airship notwithstanding side wind against the jet of air issuing from the shed in a known direction, and which is almost without eddies. This is connected with no difficulties whatever even in a strong wind, because the axis of the air ship always lies almost exactly in the direction of the wind resulting for the time being.

In the drawings affixed to this specification and forming part thereof, several embodiments of my invention are illustrated diagrammatically by way of example. In the drawings—

Fig. 1 is a cross section of a shed constructed in accordance with my invention, Fig. 2 is a sectional plan view of the shed on a reduced scale, Fig. 3 is a longitudinal section, and Fig. 4 a plan view, partly in section, of an end of a shed provided with improved door wings according to my invention, Fig. 5 is a sectional plan view of a shed provided with doors adapted to swing to the outside as well as to the inside of the shed, the doors being shown closed, Fig. 6 is a similar view, the doors being shown opened and the currents of air with the wind directed at an angle to the shed being indicated by arrows, Fig. 7 is an elevation of a similar shed, partly in section on line A—A of Fig. 8.

Fig. 8 is a plan view of the shed illustrated in Fig. 7, partly in section on line B—B in Fig. 7.

Fig. 9 is an elevation, the doors being shown closed,

Fig. 10 a sectional plan view of a shed, the doors of which are adapted to be shoved into the longitudinal walls of the shed, thus forming themselves quasi longitudinal walls, one of the doors being shown partly open, Fig. 11 is a sectional elevation, the doors at one end being open, Fig. 12 a sectional plan view of a shed constructed on the same principle as that illustrated in Figs. 9 and 10.

Figure 1:
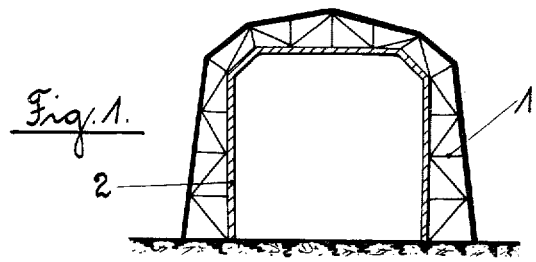
Figure 2:
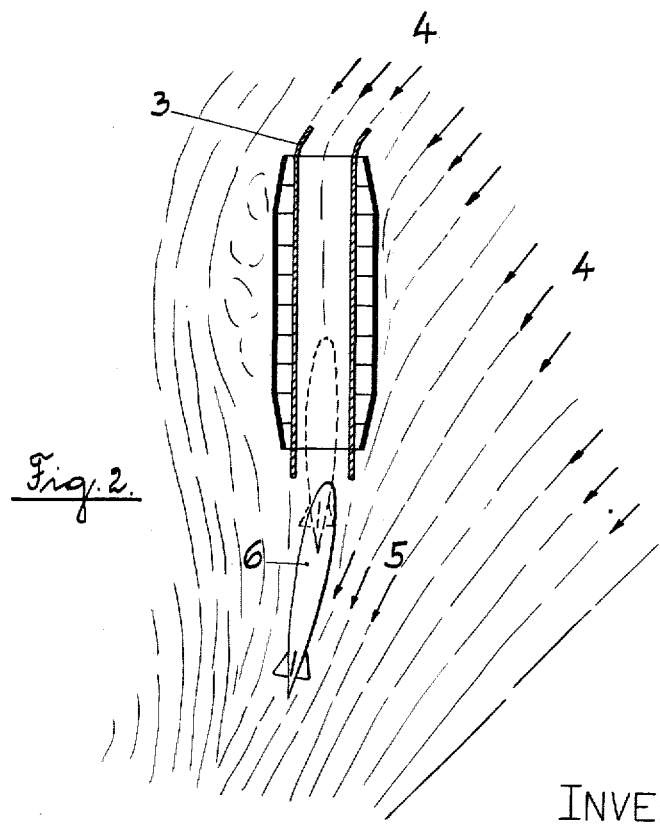

Referring now to Figs. 1 and 2, the transverse pillars and girders 1 are disposed at the outside of the walls 2 of the shed which are smooth inside in longitudinal direction. The wings of doors 3 are made in several parts. The direction of wind is indicated by arrows 4. Arrows 5 show how the jet of air issuing from the shed is deflected only gradually by the side wind. The airship 6 disclosed in two positions in full and dotted lines illustrates the manner of recovering it regardless of the side wind.

In consequence of the large dimensions of shed doors, the support afforded by the hinge pins alone does not suffice so that it is necessary to support at least a third point of the door wing. In wings made in one part, this is usually effected by aid of a car arranged at an outer edge of the wing. In wings made in two or more parts, as illustrated in Figs. 3 and 4, it would be very difficult to thus support the outer wings inasmuch as the path described by their outer edges is not a definite one. Cars adapted to be displaced, link devices and the like involve a considerable incumbrance which is expensive per se. Moreover, with such devices the arrangement of a suitable central drive and a central locking arrangement is difficult.

According to my invention, this drawback is avoided by guiding each outer wing on a track which is secured to the adjacent inner wing to which said outer wing is hinged. Owing to this expedient, the paths of the wing supports are predetermined and the common driving means and the locking means can be arranged on one wing, preferably the inner or principal wing of two-winged doors. Besides, such an arrangement requires only a single main track for the inner wing which is either placed on the ground or secured to the frame of the shed, while the tracks of the outer wings need only extend over a small arc, corresponding to the angle at which a curving of the doors appears necessary. This involves the further advantages that all winged doors on one side form a unit, which can be actuated and locked as such, and that, provided that the roof of the shed be extended beyond the end walls, the winged doors form polygonal closures whose convexity can be varied. This not only reduces the wind pressure on account of the more favourable stream line form of the ends but also saves space inside the shed.

Referring now to Figs. 3 and 4, the inner or main wings 8 are hinged to the walls 7 of the shed. Secured to the wings 8 are platforms 9 each of which carries a rail 10 for the supporting wheels 11 of the outer wings 12 hinged to the wings 8. The platforms 9 and the wings 8 are supported by wheels 13 which run on rails 14 placed on the ground. Electromotors for driving the wheels 13 are indicated at 15, the locking means being indicatd diagrammatically at 16. The platforms 9 are connected with the main wings 8 by struts 17.

In order to direct the wind deflected by the position of the doors as uniformly as possible into the axis of the shed the doors, as illustrated in Figs. 5 to 8, where they comprise cambered and substantially cylindrical wings, may be adapted to swing to the outside as well as to the inside of the shed, providing in a simple and suitable manner an inlet nozzle for the wind, no edges or corners interfering with its deflection. On the contrary: the wing turned inside the shed assists the formation of a uniform jet, as otherwise by contraction of the main current eddies might form at the wall opposite to the injection nozzle formed by the door.

The curved form of the doors involves another advantage inasmuch as it is possible to design the shed with convex hood- or calotte-shaped ends combined with a projecting roof preferably cambered on the outside, which not only reduces the wind pressure on account of the more favourable flow of air but also saves space inside the shed. When the doors are open, the projecting roof directs the air also in a horizontal direction, a sort of funnel being formed by the partial closure at the top.

In the shed illustrated in Figs. 5 and 6, the doors 18 are formed by hollow cylindrical surfaces. The roof which is indicated in broken lines at 19 in Fig. 6 projects beyond the side walls 20 at the ends of the shed. The wheels 21 supporting the doors run on circular rails 22 which permit the doors to swing into the shed, as illustrated at the upper right hand corner of Fig. 6. Arrows 23 indicate the direction of the currents of air when the wind flows at an angle to the longitudinal axis of the shed.

In the shed illustrated in Figs. 7 and 8, the doors 24 which are calotte-shaped at their upper ends, afford a particularly favourable flow of the air when the doors are closed and a particularly favourable deflection of the air when they are open, in combination with the roof projecting beyond the side walls 25 at the ends, the roof 26 being shaped so as to form a smooth connection with the door.

Further modifications of sheds according to my invention and provided with doors suitable for deflecting the air are illustrated in Figs. 9 to 12. Here the doors consist of several parts 28, 29, 30 each part separately transmitting the forces exerted thereon onto guides arranged on the ground and at the level of roof 31. In the construction illustrated in Figs. 9 and 10, the several parts 28, 29 and 30 are adapted to be pushed into recesses on the outside of the sidewalls 27 of the shed.

In the construction illustrated in Figs. 11 to 12, the parts 28 and 29 of the doors are shaped like calottes and guided on circular tracks placed on the ground.

I wish it to be understood that I do not desire to be limited to the exact details of construction shown and described, for obvious modifications will occur to a person skilled in the art.

I claim:

1. A shed for aircraft comprising a tunnel-like structure; openings at both ends of said structure; doors for closing said openings; the doors at one end adapted to force air into the structure in case of the wind blowing at an angle to its axis; the doors at the other end allowing axial escape to the air current flowing through the shed.

2. A shed for aircraft comprising a tunnel-like structure; openings at both ends of said structure; doors for closing said openings; the doors at one end adapted to force air into the structure in case of the wind blowing at an angle to its axis; the doors at the other end allowing axial escape to the air current flowing through the structure; the inner surface of said structure being smooth and giving no obstacles to an air current passing through said structure.

3. A shed for aircraft comprising a tunnel-like structure; openings at both ends of said structure; doors for closing said openings; the doors at one end each consisting of individual sections and adapted to force air into the structure in case of the wind blowing at an angle to its axis; the doors at the other end allowing axial escape to the air current flowing through the shed.

4. A shed for aircraft comprising a tunnel-like structure; openings at both ends of said structure; doors for closing said openings; the doors at one end each consisting of several sections hinged together and adapted to force air into the structure in case of the wind blowing at an angle to its axis; the doors at the other end allowing axial escape to the air current flowing through the shed.

5. A shed for aircraft comprising a tunnel-like structure, openings at both ends of said structure; doors for closing said openings; the doors at one end each consisting of two sections hinged together and means connected with the inner sections for guiding the outer sections of said doors; the doors at the other end allowing axial escape to an air current flowing through the shed.

6. A shed for aircraft comprising a tunnel-like structure; openings at both ends of said structure; doors for closing said openings; and means for deflecting an air current hitting one opening at an angle to the axis of the structure so as to pass through the structure and to leave the other opening in the direction of this axis.

7. A shed for aircraft comprising in combination a roof projecting beyond an end of the shed and a door connected with the said end and adapted to guide the wind in the direction of entrance of the craft, said roof and door forming a polygonal end closure of variable convex shape.

In testimony whereof I affix my signature.

PAUL JARAY.

Certificate of Correction.

It is hereby certified that Letters Patent No. 1,508,227, granted September 9, 1924, upon the application of Paul Jaray, of Friedrichshafen, Germany, for an improvement in "Aircraft Sheds," were erroneously issued to "the firm:—Luftschiffbau Zeppelin Gesellschaft mit beschrankter Haftung, of Friedrichshafen, Germany," as assignee of the entire interest in said invention, whereas said Letters Patent should have been issued to the inventor said *Jaray* and the firm: *Luftschiffbau Zeppelin Gesellschaft mit beschrankter Haftung, of Friedrichshafen, Germany*, said firm being assignee of *one-half* interest only in said invention, as shown by the records of assignments in this office; and that the said Letters Patent should be read with this correction therein that the same may conform to the record of the case in the Patent Office.

Signed and sealed this 13th day of October, A. D. 1925.

[SEAL.]

KARL FENNING,
*Acting Commissioner of Patents.*